United States Patent
Maybach

[15] 3,665,304
[45] May 23, 1972

[54] SIGNAL AMPLITUDE AND PHASE HOMODYNE

[72] Inventor: Richard Lee Maybach, Holmdel, N.J.
[73] Assignee: Bell Telephone Laboratories, Incorporated, Murray Hill, N.J.
[22] Filed: Dec. 28, 1970
[21] Appl. No.: 101,813

[52] U.S. Cl. ............................324/85, 324/140, 325/444, 328/133, 328/151, 329/124
[51] Int. Cl. .................................................H04b 1/16
[58] Field of Search ..............324/85, 83 Q, 140 R; 325/444, 325/342; 329/124; 331/25; 328/133, 151

[56] References Cited

UNITED STATES PATENTS

| | | | |
|---|---|---|---|
| 2,964,622 | 12/1960 | Fire | 328/133 X |
| 3,286,176 | 11/1966 | Birnboim | 328/133 X |
| 3,430,143 | 2/1969 | Walker et al. | 328/133 X |
| 3,500,217 | 3/1970 | Allen | 329/124 X |
| 3,566,274 | 2/1971 | Di Toro | 325/444 X |
| 3,609,557 | 9/1971 | Goell | 325/444 X |

Primary Examiner—Stanley T. Krawczewicz
Attorney—R. J. Guenther and William L. Keefauver

[57] ABSTRACT

Homodyne signal detection apparatus which utilizes a unitary signal channel including a single mixer for processing an applied input signal with successively applied waveforms separated in phase by $\pi/2$ radians is disclosed. The product signals of each waveform and the input signal are filtered, stored, and selectively combined to develop signals which are sinusoidal or cosinusoidal functions of the phase angle of the applied signal and have magnitudes proportional to the amplitude of the input signal.

19 Claims, 3 Drawing Figures

Patented May 23, 1972

INVENTOR
R. L. MAYBACH
BY
Gerard E. Murphy
ATTORNEY

SIGNAL AMPLITUDE AND PHASE HOMODYNE

BACKGROUND OF THE INVENTION

This invention pertains to signal amplitude and phase measuring apparatus and, more particularly, to signal amplitude and phase measuring apparatus utilizing the homodyne principle of detection.

Homodyne detection is widely used in commercial measuring apparatus because of its inherent simplicity and relatively low cost. Typically, as described in detail hereinafter, a homodyne detector comprises two signal channels, each including a mixer, i.e., product modulator or detector, for processing applied signals with quadrature related modulating signals. The use of two mixers, and the requirement for precise analog phase shifting apparatus gives rise to a number of problems. In practice, it has been extremely difficult to maintain the exact quadrature relationship between the two channels of the detector. Furthermore, each mixer gain may vary and be affected differently by temperature and aging; also, additive d.c. (offset) terms, introduced in each channel, may vary with temperature, time, and applied signal level. It is clear that each of these sources of error contributes to an unreliable measurement of signal amplitude and phase.

SUMMARY OF THE INVENTION

In accordance with the principles of this invention, these limitations of prior art homodyne detectors are overcome by using a single, i.e., unitary, signal channel, including a single mixer, for processing an applied input signal with successively applied waveforms separated in phase by $\pi/2$ radians. The product signals of each waveform and the input signal are filtered, stored, and selectively combined to develop signals which are sinusoidal or cosinusoidal functions of the phase angle of the applied input signal and have magnitudes proportional to the amplitude of the input signal.

DETAILED DESCRIPTION OF THE INVENTION

Figure 1:
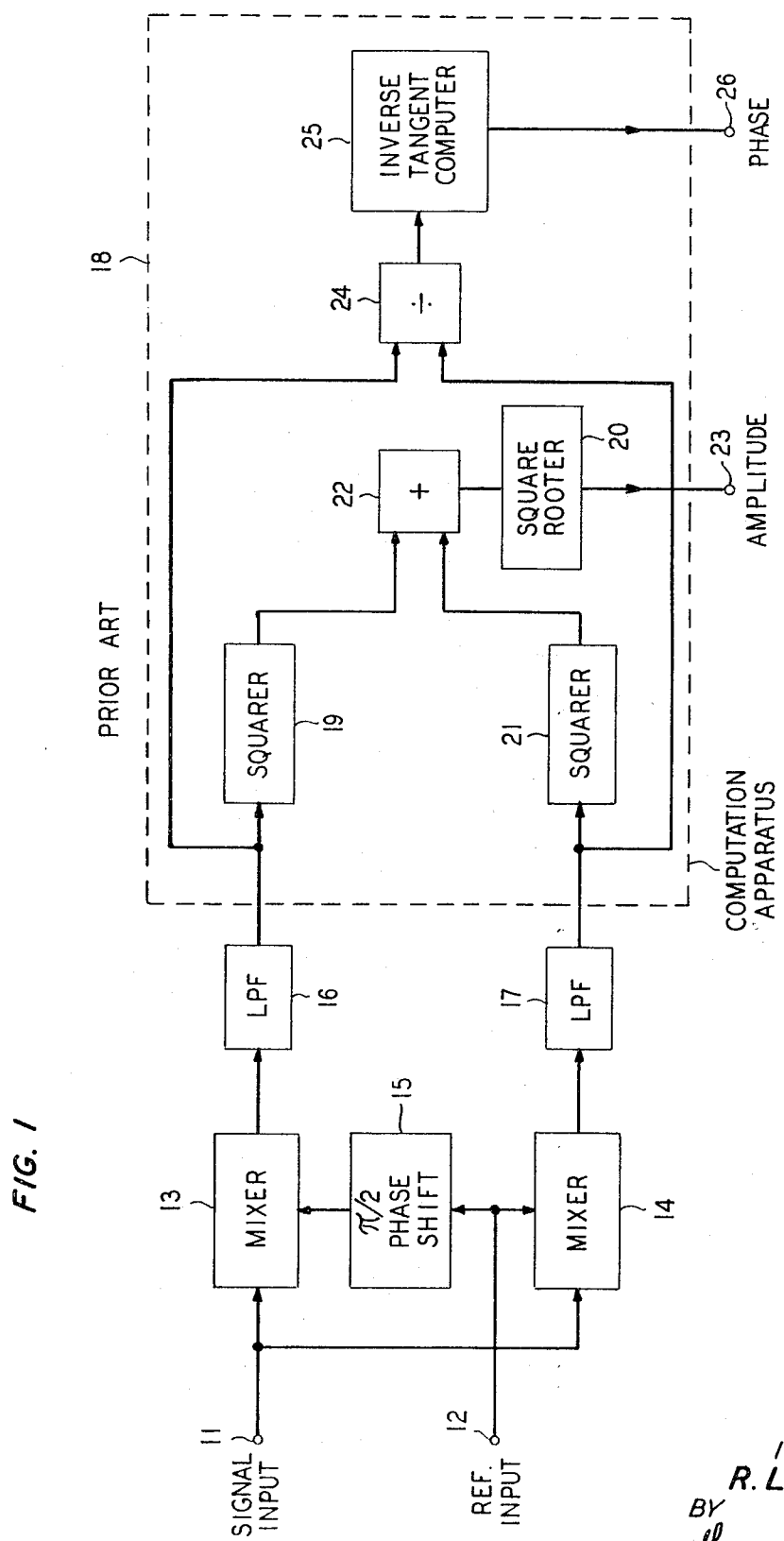
FIG. 1 is a block diagram of prior art signal amplitude and phase measuring apparatus.

In the prior art homodyne detection apparatus of FIG. 1, a signal to be measured is applied to input terminal 11 and conveyed to mixers, i.e., product modulators, 13 and 14. A reference signal, of the same frequency as the input signal, is simultaneously applied to reference input terminal 12 and in turn applied directly to mixer 14 and, via $\pi/2$ phase shift network 15, to mixer 13. The result product signals of mixers 13 and 14 are applied, respectively, to low-pass filters 16 and 17 to remove undesirable high frequency signals. Thus, two signals, inphase and quadrature, each proportional to the amplitude of the input signal and, respectively, a sinusoidal or cosinusoidal function of the phase angle of the applied input signal, are, in theory, developed. In some applications, e.g., making Nyquist plots, these two signals are satisfactory, but usually they must be converted to polar form. After the two signals are squared in devices 19 and 21, and combined by adder 22, a signal proportional to the square of the amplitude of the input signal is, ideally, developed. Square rooter apparatus 20 develops a signal proportional to the square root of the signal applied to it, and thus proportional to the amplitude of the input signal, on output lead 23. Simultaneously, the signals developed by filters 16 and 17 are divided, one by the other, in divider 24 to develop a signal proportional to the tangent of the phase angle of the applied input signal. This signal is processed by apparatus 25 to develop the desired phase information on lead 26. The apparatus enclosed by broken line 18, i.e., squarers 19 and 21, adder 22, etc., will be identified hereinafter as computation apparatus 18.

Assuming that the applied input signal may be designated as $A \cos(\omega_o t + \theta)$, where $\omega_o$ is the radian frequency of the input signal and $\theta$ its phase, and assuming that the reference signal is equal to $\cos \omega_o t$, the product signal of mixer 13 will be equal to:

$$G_1 A \sin \theta + D_1 + G_1 A \sin(2\omega_o t + \theta), \quad (1)$$

and the product signal of mixer 14 will be equal to:

$$G_2 A \cos \theta + D_2 + G_2 A \cos(2\omega_o t + \theta), \quad (2)$$

where $G_1$ and $G_2$ are, respectively, the gains of mixers 13 and 14, and $D_1$ and $D_2$ are d.c. error or offset terms introduced by the mixers.

After removal of the high frequency terms, the output of filter 16 is equal to:

$$G_1 A \sin \theta + D_1, \quad (3)$$

and the output of filter 17 is equal to:

$$G_2 A \cos \theta + D_2. \quad (4)$$

It is clear that the presence of terms $G_1$, $G_2$ and $D_1$, $D_2$ adversely affects the proper computation of the amplitude and phase of the input signal since squaring, adding, square rooting will not produce a signal directly proportional to the amplitude $A$ of the input signal, and dividing and processing by apparatus 25 will not produce a signal directly proportional to $\theta$, the phase angle of the input signal. Of course, in the ideal case, mixer gains $G_1$ and $G_2$ are equal and the drift terms $D_1$ and $D_2$ are zero. Unfortunately, such is not the case in the real world, and the conventional homodyne detector is inherently productive of error. Furthermore, proper operation is absolutely dependent upon maintaining an exact quadrature relationship between the two modulating signals applied to mixers 13 and 14. As is well known, it is extremely difficult to realize an analog phase shift network which complies with this exacting criterion.

Figure 2:
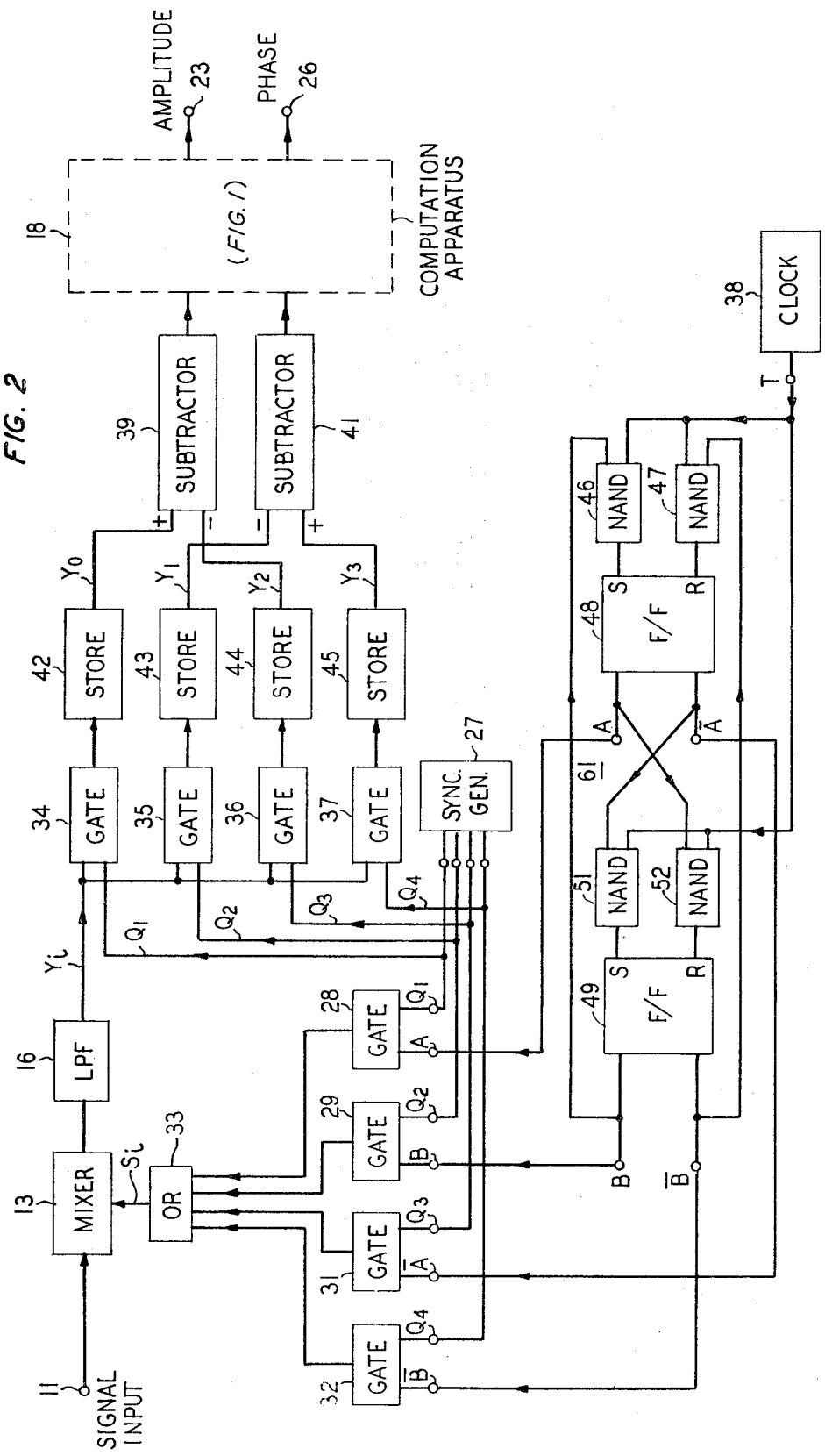
FIG. 2 is a block diagram of signal amplitude and phase measuring apparatus in accordance with this invention.
Figure 3:
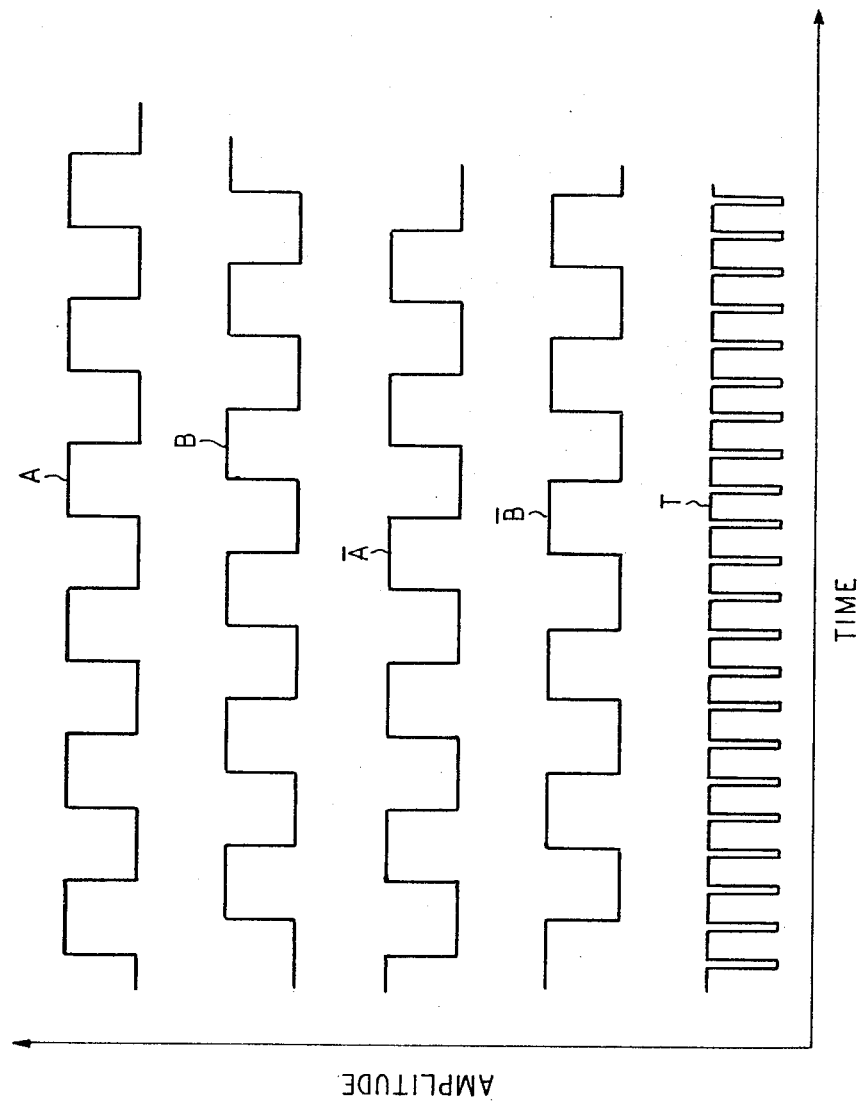
FIG. 3 depicts various signal waveforms which are utilized in the apparatus of FIG. 2.

In accordance with the principles of this invention, these limitations are overcome by utilizing the apparatus depicted in FIG. 2. As shown in FIG. 2, only one mixer 13 is used, therefore eliminating any errors arising from unequal mixer gains. It will also be noted that an analog phase shift network is not required, thus eliminating improper maintenance of quadrature as a source of error. The signal to be measured is applied via terminal 11 to mixer 13 wherein it is successively and periodically product modulated by four quadrature related waveforms, i.e., waveforms displaced in phase by $\pi/2$ radians as depicted in FIG. 3, each having a fundamental frequency equal to the applied input signal. The modulating waveforms are applied by OR gate 33 to mixer 13; the generation of these waveforms will be discussed hereinafter.

Considering only the fundamental frequency component of each pulse train waveform of FIG. 3, the modulating signals may be characterized by:

$$S_i = \cos(\omega_o t - i\pi/2), \quad i = 0,1,2,3$$

where $$S_0 = A, \ S_1 = B, \ S_2 = \overline{A}, \ S_3 = \overline{B}. \quad (5)$$

Stated another way, $S_1$ lags $S_0$, $S_2$ lags $S_1$, and $S_3$ lags $S_2$, each respectively by precisely $\pi/2$ radians, i.e., 90°. After successive modulation of the input signal, in mixer 13, with each waveform and filtering, four successive output signals, $Y_i$ appear at the output of low-pass filter 16, each corresponding to a modulation product of the input signal and a waveform having the same identifying subscript, $i$. These signals may be expressed as:

$$Y_i = GA \cos(\theta + i\pi/2) + D, \quad i = 0,1,2,3$$

or $$Y_0 = GA \cos \theta + D$$
$$Y_1 = -GA \sin \theta + D$$
$$Y_2 = -GA \cos \theta + D$$
$$Y_3 = GA \sin \theta + D. \quad (6)$$

It will be noted that the gain term $G$ is identical for each signal, since the same mixer is used, and that the d.c. drift term $D$ is also common to all signals. Each signal $Y_i$ is respectively applied via gates 34, 35, 36, and 37 to a storage network 42, 43, 44, 45. The output signals of the storage networks are combined by subtractors 39 and 41 to develop two signals $I$ and $U$ which may be expressed as:

$$I = Y_0 - Y_2 = 2 GA \cos \theta$$
$$U = Y_3 - Y_1 = 2 GA \sin \theta \quad (7)$$

The drift term $D$ of each signal $Y_i$ fortuitously cancels, and since the two signals are generated by the same product detector 13, the same gain coefficient $G$ is present in each signal. Furthermore, crosstalk, a recurring problem in prior art systems, between the inphase and quadrature channel signals, cannot occur since the successive modulations of the input signal are necessarily distinct in time. Accordingly, the limitations of prior art homodyne detection apparatus, previously discussed, are overcome by the practice of this invention.

The two signals, $I$ and $U$, are applied to computation apparatus 18, identical to that of FIG. 1, or any well-known equivalent, to develop amplitude and phase proportional signals, respectively, at terminals 23 and 26.

Turning now to the manner in which waveforms $S_i$ of FIG. 3 are generated, apparatus 61 of FIG. 2 comprises a clock 38 which generates timing pulse signals T, shown in FIG. 3, at a frequency four times that of the input signal frequency. Clock 38 serves as a "reference input" and may either be a stable crystal controlled oscillator or circuitry responsive to a component of the applied input signal. These timing signals are applied simultaneously to NAND gates 46, 47, 51, and 52, which in turn activate the set and reset terminals of flip-flop, F/F, i.e., multivibrator, circuits 48 and 49, as indicated. By a straightforward application of well-known digital logic circuit principles, it may be readily shown that the desired waveforms $A$, $\bar{A}$, $B$, and $\bar{B}$ appear at the terminals so designated. Each of these waveforms is applied to a like designated terminal of gates 28, 29, 31, and 32. Simultaneously, synchronization, sync, generator 27 applies successive enabling control signals $Q_1$, $Q_2$, $Q_3$, and $Q_4$ to gates 28, 29, 31, and 32, and also to gates 34, 35, 36, and 37. Thus, when a signal is present, at the $Q_1$ terminal of generator 27, gate 28 is enabled and waveform A applied via OR gate 33 to mixer 13. Simultaneously, gate 34 is enabled by signal $Q_1$, thereby allowing the product output signal of mixer 13 and low-pass filter 16 to be applied to storage network 42. In a similar manner, the other waveforms $B$, $\bar{A}$, and $\bar{B}$ are consecutively applied to mixer 13 by gates 29, 31, and 32, respectively, and the gates 35, 36, and 37 successively activated to apply the filtered product signals to storage networks 43, 44, and 45. If the propagation delays of gates 28, 29, 31, and 32 are unequal, a flip-flop circuit, response to timing signals, T, may be inserted between OR gate 33 and mixer 13, to properly synchronize the applied waveforms, $S_i$. To allow sufficient time for transients to decay, each of waveforms $A$, $B$, $\bar{A}$, and $\bar{B}$ is applied to mixer 13 for an interval of time equal to approximately 50 to 100 cycles or more of the input signal, depending upon the particular filter 16 used. For example, in one embodiment of this invention, the frequency of the input signal is equal to 278 KHz, and each waveform is applied to mixer 13 and the resultant product signal to a storage network for an interval of time equal to 250 microseconds. Of course, this interval of time may be varied to suit the characteristics of a particular input signal and/or processing element.

It is to be understood that the embodiments shown and described herein are illustrative of the principles of this invention only, and that modifications of this invention may be implemented by those skilled in the art without departing from the scope and spirit of the invention; for example, the successive output signals, $Y_i$, of filter 16 (FIG. 2) may be directly applied to a unitary holding network and then converted into digital form for subsequent processing by digital apparatus.

What is claimed is:

1. Improved homodyne detection apparatus responsive to an applied signal comprising:
    first means for generating a plurality of quadrature related signal waveforms, each waveform having a frequency component corresponding to the frequency of said applied signal;
    second means responsive to said applied signal and said signal waveforms for developing a plurality of successive product signals, each selectively proportional to the product of said applied signal and one of said signal waveforms;
    third means for storing each of said product signals; and
    fourth means for selectively combining said stored signals.

2. The apparatus defined in claim 1 wherein said second means includes a product modulator and a low-pass filter.

3. The apparatus defined in claim 2 wherein said second means further comprises:
    a plurality of gate circuits, each gate circuit responsive to only one of said plurality of signal waveforms;
    means for successively enabling each of said gate circuits; and
    means for applying the output signals of said gate circuits to said product modulator.

4. The apparatus of claim 1 wherein said plurality of signal waveforms comprises first, second, third, and fourth periodic pulse trains and wherein said second pulse train lags said first pulse train by $\pi/2$ radians, said third pulse train lags said second pulse train by $\pi/2$ radians, and said fourth pulse train lags said third pulse train by $\pi/2$ radians.

5. An improved homodyne detector responsive to an applied input signal comprising:
    first means for periodically generating a plurality of successive quadrature related periodic signal waveforms, each waveform having a fundamental frequency equal to the frequency of said input signal;
    second means responsive to said input signal and said successive periodic signal waveforms for developing a plurality of product signals, each proportional to the product of said applied input signal and one of said signal waveforms;
    third means for filtering said product signals;
    fourth means for storing each of said filtered product signals; and
    fifth means for selectively combining said stored signals.

6. The apparatus defined in claim 5 wherein said second means includes a product modulator.

7. The apparatus defined in claim 5 wherein said first means further comprises:
    means for simultaneously generating a plurality of quadrature related periodic signal waveforms;
    a plurality of gate circuits, each gate circuit responsive to only one of said plurality of signal waveforms;
    means for successively enabling each of said gate circuits; and
    means for applying the output signals of said gate circuits to said second means.

8. The apparatus defined in claim 7 wherein said means for generating said plurality of signal waveforms comprises:
    first and second multivibrators each having first and second inputs and first and second outputs;
    a plurality of logic circuits, each logic circuit respectively connected to one of said inputs of said first and second multivibrators; and
    a source of timing signals connected to an input of each of said logic circuits, the first output of said second multivibrator connected to an input of said logic circuit connected to said first multivibrator first input, the second output of said second multivibrator connected to an input of said logic circuit connected to said first multivibrator second input, the first output of said first multivibrator connected to an input of said logic circuit connected to said second multivibrator second input, and the second output of said first multivibrator connected to an input of said logic circuit connected to said second multivibrator first input.

9. The apparatus of claim 5 wherein said plurality of signal waveforms comprises first, second, third, and fourth periodic pulse trains and wherein said second pulse train lags said first pulse train by $\pi/2$ radians, said third pulse train lags said second pulse train by $\pi/2$ radians, and said fourth pulse train lags said third pulse train by $\pi/2$ radians.

10. An improved homodyne detector responsive to an applied input signal comprising:
    first means for periodically generating a plurality of successive periodic signal waveforms, each waveform having a fundamental frequency corresponding to the frequency of said input signal and electrically displaced from a preceding waveform by a phase shift of $\pi/2$ radians;

second means responsive to said input signal and said successive periodic signal waveforms for developing a plurality of signals, each proportional to the product of said input signal and one of said signal waveforms;

third means for filtering said product signals;

fourth means for storing each of said filtered product signals; and fifth means for arithmetically combining said stored signals.

11. An improved homodyne detector responsive to an applied input signal comprising:

first means for generating a plurality of signal waveforms, each waveform having a fundamental frequency equal to the frequency of said input signal and shifted one from another by a phase shift of $\pi/2$ radians;

second means responsive to said input signal and an applied waveform for developing a signal proportional to the product of said input signal and an applied waveform;

third means for successively applying said phase shifted waveforms to said second means;

fourth means for filtering each of the successively developed product signals;

fifth means for storing each of said filtered product signals; and sixth means for arithmetically combining said stored signals.

12. The apparatus defined in claim 11 wherein said first means comprises:

first and second multivibrators each having first and second inputs and first and second outputs;

a plurality of logic circuits, each logic circuit respectively connected to one of said inputs of said first and second multivibrators; and a source of timing signals connected to an input of each of said logic circuits, the first output of said second multivibrator connected to an input of said logic circuit connected to said first multivibrator first input, the second output of said second multivibrator connected to an input of said logic circuit connected to said first multivibrator second input, the first output of said first multivibrator connected to an input of said logic circuit connected to said second multivibrator second input, and the second output of said first multivibrator connected to an input of said logic circuit connected to said second multivibrator first input.

13. The apparatus defined in claim 11 wherein said third means comprises:

a plurality of gate circuits, each gate circuit responsive to only one of said plurality of signal waveforms;

means for successively enabling each of said gate circuits; and means for applying the output signals of said gate circuits to said second means.

14. The apparatus of claim 11 wherein said plurality of signal waveforms comprises first, second, third, and fourth periodic pulse trains and wherein said second pulse train lags said first pulse train by $\pi/2$ radians, said third pulse train lags said second pulse train by $\pi/2$ radians, and said fourth pulse train lags said third pulse train by $\pi/2$ radians.

15. Amplitude and phase measuring apparatus responsive to an applied signal comprising:

first means for periodically generating a plurality of successive signal waveforms, each waveform having a fundamental frequency equal to the frequency of said applied signal and electrically displaced from an immediately preceding waveform by a phase shift of $\pi/2$ radians;

second means responsive to said applied signal and said successive waveforms for successively developing a plurality of signals, each proportional to the product of said applied signal and one of said waveforms;

third means for filtering each of said plurality of product signals;

fourth means for separately storing each of said filtered product signals;

fifth means for selectively combining said stored signals to remove undesired error components; and sixth means responsive to said combined signals for developing signals proportional to the phase and amplitude of said applied signal.

16. The apparatus defined in claim 15 wherein said second means includes a mixer.

17. The apparatus defined in claim 16 wherein said first means further comprises:

means for generating said plurality of signal waveforms;

a plurality of gate circuits, each gate circuit responsive to only one of said plurality of signal waveforms;

means for successively enabling each of said gate circuits; and means for applying the output signals of said gate circuits to said mixer.

18. The apparatus defined in claim 17 wherein said means for generating comprises:

first and second multivibrators each having first and second inputs and first and second outputs;

a plurality of logic circuits, each logic circuit respectively connected to one of said inputs of said first and second multivibrators; and a source of timing signals connected to an input of each of said logic circuits, the first output of said second multivibrator connected to an input of said logic circuit connected to said first multivibrator first input, the second output of said second multivibrator connected to an input of said logic circuit connected to said first multivibrator second input, the first output of said first multivibrator connected to an input of said logic circuit connected to said second multivibrator second input, and the second output of said first multivibrator connected to an input of said logic circuit connected to said second multivibrator first input.

19. The apparatus of claim 18 wherein said plurality of signal waveforms comprises first, second, third, and fourth periodic pulse trains and wherein said second pulse train lags said first pulse train by $\pi/2$ radians, said third pulse train lags said second pulse train by $\pi/2$ radians, and said fourth pulse train lags said third pulse train by $\pi/2$ radians.

* * * * *